US008082149B2

(12) United States Patent
Schultz et al.

(10) Patent No.: US 8,082,149 B2
(45) Date of Patent: Dec. 20, 2011

(54) METHODS AND APPARATUSES FOR MYOELECTRIC-BASED SPEECH PROCESSING

(75) Inventors: Tanja Schultz, Pittsburgh, PA (US); Alexander Walbel, Pittsburgh, PA (US)

(73) Assignee: Biosensic, LLC, Pittsburgh, PA (US)

( * ) Notice: Subject to any disclaimer, the term of this patent is extended or adjusted under 35 U.S.C. 154(b) by 997 days.

(21) Appl. No.: 11/924,719

(22) Filed: Oct. 26, 2007

(65) Prior Publication Data

US 2008/0103769 A1 May 1, 2008

Related U.S. Application Data

(60) Provisional application No. 60/854,586, filed on Oct. 26, 2006.

(51) Int. Cl.
*G10L 15/00* (2006.01)
(52) U.S. Cl. .......................... 704/235; 704/271; 600/547
(58) Field of Classification Search .................. 704/235, 704/271; 600/547
See application file for complete search history.

(56) References Cited

U.S. PATENT DOCUMENTS

| | | | |
|---|---|---|---|
| 7,480,616 B2* | 1/2009 | Manabe et al. | 704/254 |
| 7,676,372 B1* | 3/2010 | Oba | 704/271 |
| 7,680,666 B2* | 3/2010 | Manabe et al. | 704/267 |
| 2004/0034645 A1* | 2/2004 | Manabe et al. | 707/101 |
| 2006/0085183 A1* | 4/2006 | Jain | 704/233 |

OTHER PUBLICATIONS

Hirotoka et al. "Revolutionizing Mobile Communications through New Interface Technologies" . . . 2003 pp. 1-41.*
Shultz et al. "Session Independent Non-Audible Speech Recognition Using Surface Electromyography" pp. 331-336.*
Jorgensen et al., "Sub Auditory Speech Recognition Based on EMG Signals", Neural Networks 2003 (abstract).
Waibel et al,. "Vocal Tract Length Normalization for Large Vocabulary Continuous Speech Recognition", School of Computer Science, CMU 1997.
Jin et al., "Fast Robust Inverse Transform SAT and Multi-Stage Adaptation", Proc. DARPA Broadcast News Transcription and Understanding Workshop, 1998.
Chan et al., "Hidden Markov Model Classification of Myoelectric Signals in Speech", Engineering in Medicine and Biology Magazine 2002, vol. 21(5) p. 143-146 (abstract).
"Selected Topics in Surface Electromyography for Use in the Occupational Setting: Expert Perspectives", U.S. Department of Health and Human Services, 1992 (Publication No. 91-100).

* cited by examiner

*Primary Examiner* — Daniel D Abebe
(74) *Attorney, Agent, or Firm* — Cohen & Grigsby, PC (57) ABSTRACT

A method for myoelectric-based processing of speech. The method includes capturing a myoelectric signal from a user using at least one electrode, wherein the electrode converts an ionic current generated by muscle contraction into an electric current. The method also includes amplifying the electric current, filtering the amplified electric current, and converting the filtered electric current into a digital signal. The method further includes transmitting the myoelectric signal to a digital device, transforming the digital signal into a written representation using an automatic speech recognition method, and generating an audible output from the written representation using a speech synthesis method.

17 Claims, 3 Drawing Sheets

METHODS AND APPARATUSES FOR MYOELECTRIC-BASED SPEECH PROCESSING

CROSS REFERENCE TO RELATED APPLICATION

The present application claims priority to U.S. Provisional Patent Application No. 60/854,586 filed Oct. 26, 2006.

BACKGROUND

The drive to make human-computer interaction more user-friendly and the desire to support any kind of human-human communication and cooperation by computers has led researchers to develop machines capable of recognizing and understanding spoken input. Speech recognition systems have been built which provide good results when speech is spoken audibly with normal vocal effort in relatively quiet environments.

Speech recognition systems do much worse at trying to recognize barely audible speech, i.e. whispered speech or speech uttered with a very low vocal effort. That is because the typical (human and computer) speech perception mechanism requires the speech signal to be transmitted through air and being perceived by capturing the air pressure changes. Consequently, the speech signal is required to be above certain decibel thresholds to have a significant impact on the surrounding air particles.

Furthermore, speech recognition systems which are based on this mechanism cannot recognize non-audible or silently mouthed speech since no air pressure changes can be measured on this kind of speech. As a result, those applications which rely on confidential user input, such as password restricted access systems, are difficult to drive with speech. Also, any kind of confidential conversation, for example phone calls in public places, are in danger of being eavesdropped. In general, speech-based human-machine interaction or human-human communication cannot be pursued without being audible to bystanders and thus potentially be disturbing to the surroundings.

Speech recognition systems also do much worse at trying to recognize air-transmitted signals of speech which is uttered in a noisy environment, such as in a car, in an airport, or in a crowded restaurant. That is because any non-speech related sound and noise of the speaker's environment is transmitted through the same surrounding air and thus overlaps with the relevant speech signal. Current solutions such as close-speaking and directional microphones rely on audible speech. Furthermore, solutions such as microphone arrays are less mobile and expensive. Although algorithms such as noise cancellation, beamforming, and source separation are under heavy investigation, the speech recognition performance in the presence of noise is still suboptimal.

Thus, the need arises to provide mechanisms to overcome the limitations of speech recognition applications due to the problem of confidentiality and/or disturbance, and the lack of robustness in noisy environments.

Based on the various types of speech recognition systems currently sold in the marketplace, such systems may be divided into five types: recognition engines, command & control systems, dictation systems, and special purpose speech-driven applications, and speech translation.

Recognition engines are primarily software, which take a spoken utterance as input, and produce a text hypothesis as output. The utterance has to be audibly spoken since speech is usually captured with an air transmission microphone. Recognition engines may be either discrete-word or continuous-speech systems. With discrete-word systems, the recognizer can only recognize a single word at a time, so the user must pause between each word until the recognizer produces the output for the last word spoken.

Command & Control recognition systems are generally used for single-word or few-word commands used to affect and control some system with speech. Most have a small, fixed vocabulary of between ten and one hundred commands that can be recognized in any one situation. No Command & Control systems can be used in a silent, confidential speech-driven mode. Instead the general use of such a system is either disturbing to the public or all audible commands might get overheard by any bystander, a particularly serious problem for verification, authentication, and access control systems.

In contrast to Command & Control systems, dictation recognition systems must handle a very large vocabulary, like tens or hundreds of thousands of possible words. For dictation systems, useful for applications such as SMS text messaging or emails the lack of robustness in noisy environments is a major challenge. There are no continuously spoken large vocabulary recognition engine or dictation system that handles spoken speech recorded by myoelectric signals, which remain unaffected by surrounding noise.

There are also commercially available special purpose speech-driven applications. Such applications have been developed for particular purposes such as pocket-size personal digital assistants. In such scenarios, the user may carry the device along the whole day, and continuously use it to take notes, generate reports, and complete forms. Particular prominent fields are medical and legal fields. Here, the filed information is often confidential. Furthermore, the constant usage of such carry-along systems may be disturbing to coworkers.

A speech translation system recognizes the speech input spoken in one language, translates the recognized words into another language, and speaks the translated words aloud. This application enables users to have their personal translator at their disposal. However, if translation is performed instantly, the listener is confronted with two interfering speech sources, the mother tongue of the original speaker and the audible translated speech. A translation system that handles spoken speech recorded by myoelectric signals would allows for processing of silently mouthed speech and thus would no longer confuse listeners. There are no speech translation systems that handle speech recorded by myoelectric signals.

Another translation application is the Phraselator that is currently used by the Department of Defense. It primarily consists of a microphone, an automatic speech recognition module, a language translation module, and a synthesizer with loudspeaker. The system is routinely used in military environments which are typically very noisy. The system's performance is known to dramatically degrade in the presence of noise. The performance can be somewhat improve when directional microphones are applied and the user holds the microphone close to the mouth of the speaker. However, not the best directional microphones give satisfying performance in noisy military environments. Thus, there is a great need for an apparatus that is immune to the surrounding noise such as in military and other environments.

Despite the various benefits a conventional speech-driven interface provides to humans, there are three major drawbacks. First, the audible (i.e. acoustic) speech signal prohibits a confidential conversation with or through a device. Also, talking can be extremely disturbing to others, especially in libraries or during meetings. Second, the speech recognition performance degrades drastically in adverse environmental conditions such as in restaurants, cars, or trains. Acoustic model adaptation can compensate for these effects to some degree. However, the pervasive nature of mobile phones challenges this approach. Performance is also poor when sound production limitations occur, such as under water. Third, conventional speech-driven interfaces cannot be used by speech handicapped people, for example those without vocal cords.

Conventional speech recognition systems routinely use air-conducting type microphones for converting speech into electric signals. These microphones pick up the acoustic signal traveling through air away from the sound source in any direction. If several sound sources exist, such as in noisy environments, directional microphones may allow distinguishing separate sound sources. However, no such microphone can differentiate between sounds coming from human voices or from surrounding noise. Reverberation, distance from the source, and moving sources add to the complexity of overlapping sounds.

Bone-conducting microphones use the fact that the sound vibration during the speaking act provokes vibrations of the bones and the skin of the body, especially of the skull. Although the quality of the bone-conducted signal is not equivalent to the air-conducted signal, it carries information that is good enough to reproduce spoken information. Several bone-conducting microphones are available on the market. These are all worn externally creating an indirect contact with the bone at places like the scalp, ear canal, mastoid bone, throat, tooth, cheek bone, and temples. With the exception of teeth microphones, all bone-conducting microphones have to compensate for the information loss resulting from the presence of skin that stretches between the bones and the sensor. Therefore, the sensors have to apply some pressure which is very discomforting for the wearer, especially for all-day usage. For some users, scalp-microphones can lead to headaches, ear-canal microphones to ear infections, and throat microphones even may provoke a strangulation sensation. Tooth microphones interfere with the speaking act and are therefore difficult to apply in speech communication devices.

All of the above microphones require some vocal effort made during the speaking act since the sound transmission relies either on measurable pressure changes caused by moving air particles or relies on the vibration of the human body due to the vibration of the vocal cords. Consequently, none of these microphones would be able to capture silently spoken or mouth speech, i.e. speech without any vocal effort.

A new alternative is a microphone which picks up electrical potential differences resulting from muscle activity. Speech is produced by muscles of the articulatory apparatus. Thus, capturing the articulatory muscles by surface electromyography, the resulting signals contain information relevant for the interpretation of speech. This process works even if the speech is produced silently, i.e. without vocal effort.

In A. D. C, Chan, K. Englehart, B. Hudgins, and D. F. Lovely, "Hidden markov model classification of myoelectric signals in speech," Engineering in Medicine and Biology Magazine, IEEE, vol. 21, pp. 143-146, 9 2002, the authors proved that the myoelectric signal (MES) from articulatory face muscles contains sufficient information to discriminate words. This holds even when the words are spoken nonaudibly, i.e. when no acoustic signal is produced. See C. Jorgensen, D. Lee, and S. Agabon, "Sub auditory speech recognition based on emg/epg signals," in Proceedings of the International Joint Conference on Neural Networks, 2003.

To date, the practicability of MES based speech recognition is still limited. First, the surface electrodes require a physical contact with the speaker's skin. Second, experiments are still restricted to isolated word recognition. Third, today's systems are far from being robust, since they only work in matching training and test conditions. Just like conventional speech recognizers, the MES based systems are heavily influenced by speaker dependencies, such as speaking style, speaking rate, and pronunciation idiosyncrasies. Beyond that, the myoelectric signal is affected by even slight changes in electrode positions, temperature or tissue properties. See "Selected topics in surface electromyography for use in the occupational setting: Expert perspective," 3 1992, DHHS(NIOSH) Publication No 91-100. Such a phenomenon is referred to as "session dependence" in analogy to the "channel dependence" of a conventional speech recognizer resulting from the microphone quality, the environmental noise, and the signal transmission of the acoustic signal. The loss in performance caused by session dependence in MES based speech recognition is significantly higher than that resulting from channel conditions in conventional systems. Despite this, only session dependent MES based speech recognition systems have been developed so far.

SUMMARY

In various embodiments, the present invention is directed to a method for myoelectric-based processing of speech. The method includes capturing a myoelectric signal from a user using at least one electrode, wherein the electrode converts an ionic current generated by muscle contraction into an electric current. The method also includes amplifying the electric current, filtering the amplified electric current, and converting the filtered electric current into a digital signal. The method further includes transmitting the myoelectric signal to a digital device, transforming the digital signal into a written representation using an automatic speech recognition method, and generating an audible output from the written representation using a speech synthesis method.

In various embodiments, the present invention is directed to an apparatus. The apparatus includes a recording system adapted to capture, amplify, filter, convert, transmit, and transform a silent speech signal from a first party and a myoelectric-based recognizer adapted to convert the signal into a written form of corresponding speech. The apparatus further includes a device for transmitting the written form to a second party, a first output device for displaying the written form to the first party, and a second output device for displaying the written form to the second party and for transforming the written form into audible speech, wherein the apparatus is adapted to recognize and generate large vocabulary tasks in any domain, any language, and any speaking style.

In various embodiments, the present invention is directed to an apparatus. The apparatus includes means for capturing a myoelectric signal from a user using at least one electrode, wherein the electrode converts an ionic current generated by muscle contraction into an electric current and means for amplifying the electric current. The apparatus also includes means for filtering the amplified electric current, means for converting the filtered electric current into a digital signal, and means for transmitting the myoelectric signal to a digital device. The apparatus further includes means for transforming the digital signal into a written representation using an automatic speech recognition method and means for generating an audible output from the written representation using a speech synthesis method.

Those and other details, objects, and advantages of the present invention will become better understood or apparent from the following description and drawings showing embodiments thereof.

BRIEF DESCRIPTION OF THE DRAWINGS

The accompanying drawings illustrate examples of embodiments of the invention. In such drawings.

DESCRIPTION

Electromyography (EMG) is the process of recording the electrical activity of a muscle. When a muscle fiber is activated by the central nervous system, small electrical currents in form of ion flows are generated. Because electrical current moves through a resistance, the bodily tissue, it creates an electrical field. The resulting potential differences can be measured between certain regions on the body surface. A surface Electromyogram is the record obtained from measuring these voltages over time.

Various embodiments of the present invention include methods and systems that include a microphone that captures and transmits a myoelectric signal representing speech, and a recognition component which receives the transmitted signal, interprets the content, and generates in response a hypothesized text. The myoelectric signals corresponding to activity of the articulatory muscles during the speech production are automatically segmented into units such as words or syllables or phones or articulatory features or context independent phones or dependent phones and the combination of the units allowing for the development of large vocabulary speech recognition based on articulatory muscle activity.

Embodiments may be used in, for example, noisy environments or in confidential situations. Furthermore, embodiments allow detection, recognition, translation, and synthesized mouthed, i.e. silently spoken speech, such that one person can mouth words in, for example, English and the translated speech will be perceived by a communication partner in another language, like speaking in a different tongue.

Figure 1:
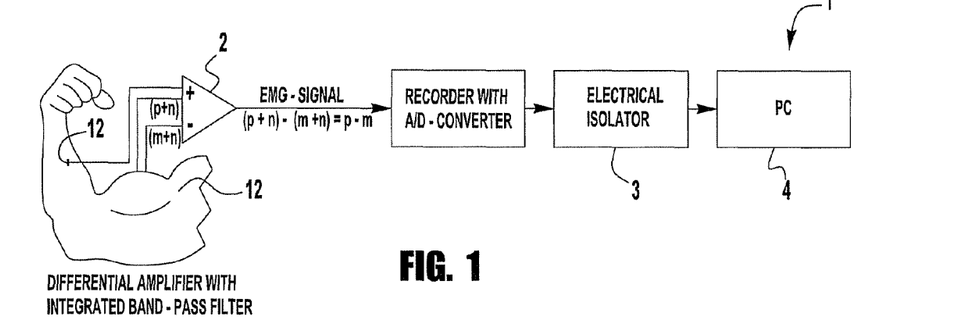
FIG. 1 illustrates a system for capturing a muscle activity signal and converting the signal to a computer readable signal.

FIG. 1 illustrates a system 1 for capturing a muscle activity signal and converting the signal to a computer readable signal. Surface electrodes 12 convert the ionic currents generated by muscle contraction into electronic currents that can be fed into electronic devices. While the detection electrodes 12 serve to pick up the desired signal, the ground electrode provides a common reference to the differential input of the preamplifier. When detecting an EMG signal, amplification by amplifier 2 optimizes the resolution of the digitizing equipment and maximizes the signal-to-noise ratio. Therefore, the differential amplifier 2 subtracts the signals from two detection sites and amplifies the difference voltage between its two input terminals. In order to ensure safety the subject is electrically isolated from any electrical connection to the power source by an electrical isolator 3. The signals are A/D-converted for further processing in computer devices 4.

Figure 2:
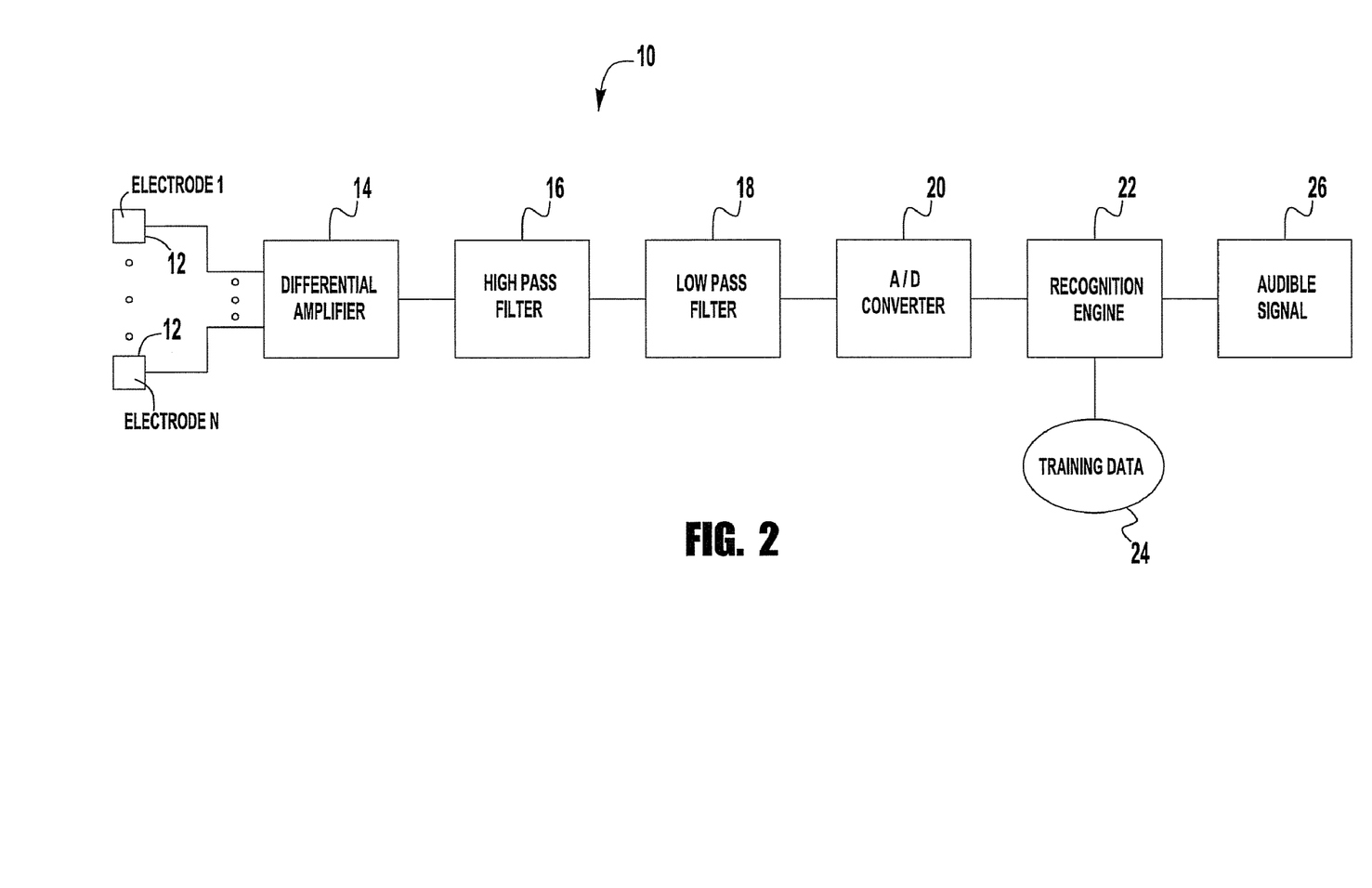
FIG. 2 illustrates an embodiment of a non-audible speech recognition system.

FIG. 2 illustrates an embodiment of a non-audible speech recognition system 10. Surface electrodes 12 convert the ionic currents generated by muscle contraction of a user into electronic currents that can be fed into electronic devices. Two detection electrodes pick up the desired signal and a ground electrode provides a common reference. When detecting an EMG signal, amplification may be used to optimize the resolution of the digitizing equipment.

A differential amplifier 14 subtracts the signals from two detection sites and amplifies the difference voltage between its two input terminals. As a consequence, signals common to both electrodes—such as noise originating far away from the detection sites—ideally produce a zero output, whereas local EMG signals are amplified. In this way the signal-to-noise ratio is maximized.

A high-pass filter 16 is applied to avoid aliasing artefacts and a low-pass filter 18 is used to reduce movement artefacts in the signals. An A/D-converter 20 is deployed to allow further processing and analysis of the raw EMG data. The EMG data is input to a recognition engine 22 that has been trained by training data 24 and an audible signal 26 representing the speech of the user is output.

In one example embodiment, isolated word recognition was performed on a vocabulary consisting of the ten English digits "zero" to "nine". Three subjects, S1 (female, mother-tongue: German), S2 (male, mother tongue: Hungarian), and S3 (male, mother-tongue: German), with no known speech disorders participated in training the system. Each subject took part in five recording sessions on four different days, in morning and afternoon sessions. In four of their sessions the subjects pronounced the words non-audibly, i.e. without producing a sound. In the remaining sessions ordinary (i.e. audible) speech was recorded. Each audible session corresponds to one non-audible session in that the two were recorded in series without the electrodes being moved.

In each recording session forty exemplars of each vocabulary word and forty exemplars of silence were recorded. The order of the words was randomly permuted and presented to the subject one at a time. A push-to-talk button controlled by the subject was used to mark the beginning and the end of each utterance. Subjects were asked to begin speaking approximately 1 second after pressing the button and to release the button about 1 second after finishing the utterance. When the pseudo-word silence appeared they were supposed keep all facial muscles relaxed for approximately 2 seconds.

Figure 3:
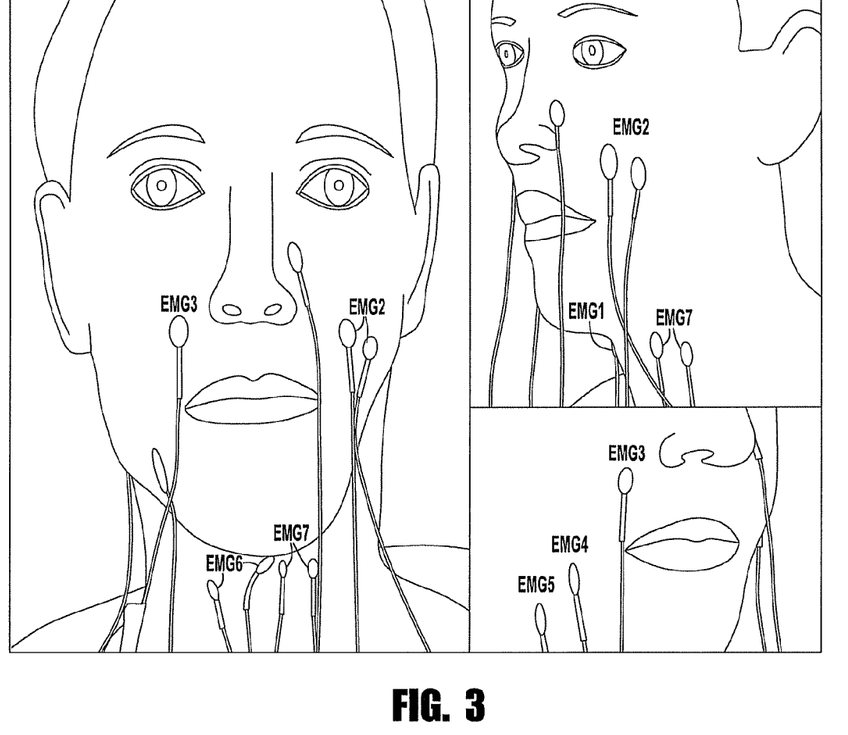
FIG. 3 illustrates an embodiment of electrode placement on a user of the system of FIG. 2.

Electrodes serve as converters for the ionic currents produced in muscles into electronic currents that can be manipulated in electronic circuits. In an example embodiment, EMG signal data is collected using seven pairs of Ag/Ag—Cl electrodes. A self-adhesive button electrode placed on the left wrist may serve as a common reference. As shown in FIG. 3, in the exemplary embodiment the electrodes were positioned such that they obtained the EMG signal of six articular muscles: the levator angulisoris (EMG2,3), the zygomaticus major (EMG2,3), the platysma (EMG4,5) the depressor angulisoris (EMG5), the anterior belly of the digastric (EMG1) and the tongue (EMG1,6,7). In the example embodiment described herein, for three of the seven EMG channels (EMG2,6,7) a classical bipolar electrode configuration with a 2 centimeter center-to-center inter-electrode spacing was used. For the remaining four channels one of the detection electrodes was placed directly on the articulatory muscles and was referenced to either the nose (EMG1) or to both ears (EMG3,4,5).

In order to ensure repeatability of electrode placements a gypsum mask was used for every speaker during system training. Holes in the masks marked the electrode positions to be used. In one embodiment, use of the mask gives more reliable results than, for example, a tape measure for position identification across sessions.

For the purpose of impedance reduction at the electrode-skin junction a small amount of electrode gel was applied to each electrode. All electrode pairs were connected to a physiological data recording system such as, for example, the Varioport recorder system. E G responses were differentially amplified, filtered by a 300 Hz low-pass and a 1 Hz high-pass filter and sampled at 600 Hz. In one embodiment, order to avoid the loss of relevant information contained in the signals, a 50 Hz notch filter was not used for the removal of line interference. However, such notch filter may be used according to various embodiments.

The signal data for each utterance was transformed into feature vectors. For each channel, 18-dimensional channel feature vectors were extracted from 54 ms observation windows with 4 ms overlap. In terms of the number of coefficients per window this corresponds to a 32 ms window at a sampling rate of 1000 Hz.

In order to obtain feature vector $o_{ij}$ for channel j and observation window i the windowed Short Time Fourier Transform (STFT) is computed in various embodiments. Delta coefficients serve as the first 17 coefficients of $o_{ij}$. The 18th coefficient consists of the mean of the time domain values in the given observation window. The complete feature vector $o_i$ for the observation window i is the concatenation of the channel feature vectors $o_{ij}$. The choice of these features is the result of intensive experiments in previous recording sessions. In one embodiment, ordinary STFT coefficients, cepstral coefficients, the zero crossing rate, LPC coefficients, and the root-mean-squared value were also considered as features but did not add to the overall performance.

First order HMMs with Gaussian mixture models are used in most conventional ASR systems as classifiers because they are able to cope with both variance in the time-scale and variance in the shape of the observed data. In one embodiment, a five-state left-to-right Hidden Markov Model $\lambda_j$ with 12 Gaussians per state for every word $W_j$ in the vocabulary was trained using the Expectation Maximization (EM) algorithm. In one embodiment, the number of iterations was chosen to be N=4.

To recognize an unknown signal the corresponding sequence of feature vectors ($o_k$) was computed. Next, the Viterbi alignment for each vocabulary word $W_j$ was determined and the word corresponding to the best Viterbi score was output as the hypothesis. Feature extraction, HMM training, and signal recognition were performed using the Janus Recognition Toolkit (JRTk) as described in Michael Finke, Petra Geutner, Herrmann Hild, Thomas Kemp, Klaus Ries, and Martin Westphal, "The Karlsruhe Verbmobil Speech Recognition Engine," in Proc. ICASSP97, Munchen; Germany, 4 1997, IEEE.

In one embodiment, to ensure comparability of results from different experiments the same number of samples was used for each classifier training, namely thirty exemplars of each word. Whenever training and testing were performed on the same session(s), a round robin procedure was applied to get reliable results. When the testing session was different from the training session(s), the training data was split into a disjoint set of training sets each satisfying the condition from above (i.e. each containing thirty exemplars of each vocabulary word) and the results for the training sets were averaged.

The system described herein may serve as a baseline system. Table 1 shows the word accuracies for within-session testing for each speaker using different numbers of channels for recognition. The term "within-session" refers to a matching training/test condition, i.e. training and testing are performed on the same session. The results for each speaker are averaged over the corresponding four non-audible sessions. Due to the fact that the round robin algorithm was applied for within-session testing (number of sessions sN, Number of round robin sets rN) and used thirty samples per word for training the classifier (number of words per set uN), there were a total of sN*rN*uN=4*4*100=1600 test samples per speaker. Table 1 presents the results for: (a) each individual channel; (b) the combination of all channels; and (c) the best combination of k=2, 3, 4, 5, 6 channels. A greedy procedure was used to identify the best combination of k channels. In one embodiment the channel yielding the best individual within session results was chosen. The remaining channels were added one by one, in the order that gave the best (within-session) performance when combined with the already selected channels.

TABLE 1

| Channels | S1 | S2 | S3 | Avg |
|---|---|---|---|---|
| Individual Channels | | | | |
| EMG1 | 74.2 | 92.1 | 77.4 | 81.2 |
| EMG2 | 64.1 | 90.7 | 69.4 | 74.7 |
| EMG3 | 76.1 | 93.8 | 72.9 | 81.0 |
| EMG4 | 61.2 | 83.1 | 71.6 | 71.9 |
| EMG5 | 62.4 | 73.4 | 63.6 | 66.5 |
| EMG6 | 63.6 | 64.4 | 52.3 | 60.1 |
| EMG7 | 59.8 | 66.3 | 60.0 | 62.0 |
| Avg EMG1-EMG7 | 65.9 | 80.5 | 66.7 | 71.1 |
| Channel Combination | | | | |
| Best 1 (EMG1) | 74.2 | 92.1 | 77.4 | 81.2 |
| Best 2 (EMG1, 3) | 93.5 | 97.6 | 90.1 | 93.7 |
| Best 3 (EMG1, 3, 6) | 97.1 | 98.1 | 91.3 | 95.5 |
| Best 4 (EMG1, 3, 4, 6) | 97.5 | 98.3 | 93.4 | 96.4 |
| Best 5 (EMG1, 2, 3, 4, 6) | 97.3 | 98.6 | 95.5 | 97.1 |
| Best 6 (EMG1, 2, 3, 4, 5, 6) | 97.4 | 98.8 | 96.2 | 97.4 |
| All 7 channels | 97.2 | 98.8 | 96.0 | 97.3 |

In the example, speaker S2 achieved the best recognition results. This speaker had already recorded several non-audible sessions before participating. He stated that lie had developed a particular speaking style for non-audible speech over time. For all speakers an increasing level of experience improved the performance. The results in Table 1 indicate a significant variation in performance for the individual channels Channels EMG1 and EMG3 yield the best recognition results for all speakers. These two channels correspond to different muscle groups, therefore providing orthogonal information. The results from the best channel combination in Table 1 reveal that it may be beneficial to apply more than one electrode (highly significant difference between Best 1 and Best 2). Even between 2 and 3 electrodes there is a highly significant performance increment on the 9.56E-05% 100% level, while the performance differences for 5, 6 or 7 electrodes are insignificant.

Table 2 shows the within-session and naive across-sessions results for speaker S3. Naive across-sessions testing refers to testing without any normalizations and adaptations. The large performance differences between within-session results and across-sessions results (values in the remaining cells) illustrate the problem of session dependence.

TABLE 2

| | session I | session II | session III | session IV |
|---|---|---|---|---|
| session I | 94.5 | 74.3 | 83.0 | 58.8 |
| session II | 67.5 | 93.5 | 80.5 | 73.8 |
| session III | 48.8 | 59.5 | 97.5 | 77.8 |
| session IV | 60.5 | 67.0 | 91.8 | 98.5 |

The results for naive across-sessions testing for all speakers are summarized in Tables 3 and 4 for all channels and for individual channels respectively (method=BASE). The numbers represent the average word accuracy when one session is used for training and on session is used for testing. Thus, in Table 3 each cell corresponding to method BASE represents the results for sN*sN=4*4=16 experiments. In Table 4 the entries represent the results for cN*sN*sN=7*4*4=112 experiments, where cN represents the number of channels.

The results for across-sessions testing are worse than those for within-session testing. Session dependence is addressed hereinbelow.

The signal obtained from surface EMG measurements depends on a number of different factors which cannot be held constant over several recording sessions. Exact electrode positioning plays a role. Although gypsum masks were used in one embodiment to increase placement repeatability, the poor across-sessions results indicate existing variation in the positioning. Experiments using the system described herein showed an across-sessions deviation of up to 5 mm. Furthermore, other factors like the amount of applied electrode gel may vary from session to session. Moreover, the speakers' speech patterns produced on different days may differ from each other. Subject S3, for example, stated that he had the impression that he pronounced the non-audibly spoken words differently in different recording sessions.

In various embodiments, the following normalization and adaptation procedures may be used to compensate for the described session dependent variations:

1. Session Combination (SC): The data to train the classifiers is shared across three sessions, each contributing the same number of samples (ten samples per vocabulary word).

2. Session Selection (SS): A conventional HMM classifier $C_i$ is trained for every training session i. The incoming unknown signal is then decoded by each classifier $C_i$, giving a hypothesis $W_i$ and a corresponding Viterbi score vi. The word with the overall best viterbi score is output as the hypothesis $W_{hyp}=W_l$; l=arg $\max_n v_n$ 3. Variance Normalization in combination with SC (SC&VN): For each training session two normalization vectors are computed—one containing the mean of each feature vector coefficient for the session's training samples and one containing the variance of each feature vector coefficient. Similarly, two normalization vectors are computed for all test session data. Prior to Viterbi path computation during training or testing, the obtained vectors were applied to normalize the extracted feature vectors $o_i$.

4. Variance Normalization with enrollment data (SC&VN enr): Similar to SC&VN but the normalization vectors for the test session are computed on enrollment data rather than on the test data itself. The enrollment data set consisted of two examples for each vocabulary word including silence.

5. Supervised Feature Space Adaptation (SC&FSA sup): Feature Space Adaptation is a constrained Maximum Likelihood (ML) transformation of input features. In analogy to Speaker Adaptive Training (SAT) (see H. Jin, S. Matsoukas, R. Schwartz, and F. Kubala, "Fast Robust Inverse Transform SAT and Multi-stage Adaptation," in Proc. DARPA Broadcast News Transcription and Understanding Workshop, Lansdowne, VA, 1998) session adaptive training was performed. First, an initial classifier is computed on three training sessions. Then, iteratively: (a) adapt each training session to the current classifier (beginning with the initial classifier); and (b) recompute the classifier models using the adapted training data. After four iterations, the final classifier is used for a supervised computation of an adaptation matrix for the test data. During testing, only adapted test data is used.

6. Unsupervised Feature Space Adaptation (SC&FSA unsup): Like SC&FSA sup but unsupervised adaptation is performed on the test data using hypothesis from the computed classifier.

7. Feature Space Adaptation with enrollment data (SC&FSA enr): Like SC&FSA sup but the adaptation matrix is computed on an enrollment data set consisting of twenty-two signals (as in SC&VN enr).

8. Feature Space Adaptation with enrollment data and iterative learning (SC&FSA enr it): Like SC&FSA enr but the adaptation matrix for the test data is recomputed after each hypothesis computation for a test signal.

9. Combinations of the above methods: When both, VN and FSA are applied, the features are first normalized and then adapted to the model.

TABLE 3

| Method | S1 | S2 | S3 | Avg |
|---|---|---|---|---|
| BASE | 74.5 | 83.7 | 70.3 | 76.2 |
| SC | 84.6 | 90.1 | 77.6 | 84.1 |
| SS | 85.2 | 88.3 | 77.3 | 83.7 |
| SC&VN | 83.4 | 94.3 | 83.7 | 87.1 |
| SC&VN enr | 84.3 | 90.3 | 79.6 | 84.7 |

In Table 3, word accuracies (in %) for across-sessions testing using all channels for recognition. Four non-audible sessions were used for each speaker and the across-sessions results were averaged.

The data set for the experiments on session independence consists of the four non-audible sessions from each speaker. Across-sessions recognition using all seven channels (Table 3) and across-sessions recognition using only one channel (Table 4) were examined. In the latter case, the word accuracies for the individual channels were averaged. Due to the fact that FSA computations led to numerical instabilities when high-dimensional data was used (seven channels correspond to 126 dimensions), feature space adaptation based methods were not applied when using all seven channels for recognition. Initial experiments using an LDA for dimensionality reduction decreased word accuracies.

As shown in Tables 3 and 4, normalization and adaptation improves performance for all speakers. The $X^2$-test confirms that the results for BASE and SC are different at a significance level of 2.93E-20%. The additional application of VN leads to another increment on a significance level of 2.84E-03%.

TABLE 4

| Method | S1 | S2 | S3 | Avg |
|---|---|---|---|---|
| BASE | 37.0 | 53.5 | 41.3 | 43.9 |
| SC | 40.3 | 59.3 | 44.2 | 47.9 |
| SS | 43.4 | 61.4 | 48.6 | 51.1 |
| SC&FSA sup | 42.5 | 62.7 | 47.7 | 51.0 |
| SC&FSA unsup | 42.0 | 62.3 | 47.0 | 50.5 |
| SC&FSA enr | 42.3 | 62.5 | 47.1 | 50.6 |
| SC&FSA enr it | 42.1 | 62.5 | 47.2 | 50.6 |
| SC&VN | 40.2 | 61.6 | 47.1 | 49.6 |
| SC&VN enr | 38.8 | 60.5 | 45.5 | 48.3 |
| SC&VN&FSA sup | 42.6 | 65.0 | 49.9 | 52.5 |
| SC&VN&FSA unsup | 42.0 | 64.6 | 49.5 | 52.0 |
| SC&VN enr&FSA enr | 41.2 | 63.7 | 48.2 | 51.0 |
| SC&VN enr&FSA enr it | 41.3 | 64.1 | 48.5 | 51.3 |

In Table 4, word accuracies (in %) for across-sessions testing using one channel for recognition and four sessions from each speaker. Each cell represents the average over all seven channels. As in ASR, combining data from several sessions improves performance considerably (session combination SC). Session Selection (SS) leads to significant improvements in performance as well. However, this method requires the training of three times as many parameters and three times as much training data. Consequently, SS is not directly comparable to the other methods. An improvement of 1.9% (1.5% absolute) was obtained for all channels and 4.6% (2.2% absolute) for individual channels when we used the same amount of training material for combination (SC) as for selection SS (thirty samples per word from each session). SS was not combined with VN and FSA. Experiments suggest, however, that a similar increase in word accuracy as with SC can be achieved.

Both tables show a significant improvement in word accuracy when Variance Normalization (VN) is applied. However, the method fails to increase word accuracies for speaker S1. This is attributed to large deviations for session and recording lengths for subject S1, which influences the amount of silence in individual utterances. This in turn leads to an unreliable estimation of the VN normalization vector. Feature Space Adaptation based methods increase the performance for all speakers. Supervised adaptation performs equally well as unsupervised adaptation. Combining FSA and VN leads to further improvements, yet the improvements are not additive, i.e. both methods address similar artifacts. In order to apply FSA based methods when several channels are used for recognition, feature dimensionality reduction techniques for EMG speech data may be used.

Both, FSA unsup and VN require the whole set of test data for initial computations. This may be impractical. Enrollment data was used for the computation of normalization vectors and adaptation matrices. According to Table 4 only a small decrease in word accuracy results when enrollment data is used. However, VN enr performs significantly worse than VN when all channels are used for recognition.

Word accuracies for across-sessions testing were improved by 18.5% (8.1% absolute) for individual channels and by 14.3% (10.9% absolute) by sharing training data across sessions and by applying methods based on Variance Normalization and Feature Space Adaptation. This indicates that conventional speech recognition methods can be transferred to EMG based recognition systems and achieve comparable word error rate reductions.

In one embodiment, to investigate the influence of speech manner (audible vs. nonaudible) on the performance of EMG based speech recognition, one audible and one non-audible session were recorded for each speaker. These two "sessions" were recorded as one session with the exact same electrode placement, i.e. the electrodes were not removed between the two parts. The only difference was the speech manner. The following aspects are now discussed: (1) whether the EMG signals produced by audible speech differ from those produced by non-audible speech; and (2) whether there is recognition performance of audible speech different from that of non-audible speech.

The recognition results across speech manners, i.e. models trained on audible speech were applied to non-audible speech and vice versa for (1) above. The recognition results between the two speech manners in a matching condition were compared, i.e. the models are trained and tested on the same speech manner. In a third experiment, the training data was shared across speech manners from each speaker to determine the performance of a recognizer that works on both non-audible and audible speech. In the latter case two systems were trained—one with the same number of parameters as the baseline system and one with twice as many parameters. The results of the experiments are shown in Table 5 for all channels and in Table 6 for individual channels respectively.

Speakers S1 and S3 have better recognition rates for audible speech than for non-audible speech. By contrast, there is no significant difference in performance for speaker S2. This may be because speaker S2 had the most experience in speaking non-audibly because there is all improvement in performance with increasing experience for all speakers. Thus, MES based recognition of non-audible speech can work as well as MES based recognition of audible speech provided that the speaker is accustomed to the speaking manner.

The relatively low results in the mismatched condition indicates that muscle movements corresponding to audible speech differ from muscle movements corresponding to non-audible speech. However, the results for the mixed systems indicate that a recognizer can be trained for both audible and non-audible speech with reasonable results. The comparison of the 12-Gaussian vs. the 24-Gaussian systems suggests to increase the numbers of parameters for the mixed system.

TABLE 5

Word Accuracies (in %) of non-audible and audible speech using all seven channels

| Speech manner | S1 | S2 | S3 | Avg |
|---|---|---|---|---|
| non-audible | 97.0 | 99.8 | 93.5 | 96.8 |
| audible | 99.5 | 98.8 | 96.0 | 98.1 |
| audible on non-audible | 72.8 | 84.5 | 64.3 | 73.8 |
| non-audible on audible | 67.2 | 92.5 | 69.3 | 76.3 |
| mixed; 12 Gaussians | 96.1 | 98.1 | 91.8 | 95.3 |
| mixed; 24 Gaussians | 96.1 | 98.4 | 93.5 | 96.0 |

TABLE 6

Word Accuracies (in %) for non-audible and audible speech using one channel for recognition. Each entry represents the average over all seven channels

| Speech Manner | S1 | S2 | S3 | Avg |
|---|---|---|---|---|
| non-audible | 63.0 | 83.4 | 60.0 | 68.8 |
| audible | 73.9 | 83.4 | 70.3 | 77.5 |
| audible on non-audible | 43.3 | 59.4 | 39.2 | 47.3 |
| non-audible on audible | 39.0 | 60.9 | 32.7 | 44.2 |
| mixed; 12 Gaussians | 62.6 | 79.3 | 57.3 | 66.4 |
| mixed; 24 Gaussians | 64.7 | 81.1 | 59.7 | 68.5 |

Embodiments of a speech recognition system based on myoelectric signals have been described herein. To cope with the challenges of surface electromyography based speech recognition, namely session dependence, a variety of signal normalization and model adaptation methods have been described herein. In various embodiments, conventional speech recognition systems for channel and speaker adaptation are used for session adaptation in EMG based speech recognizers. Various embodiments utilize sharing training data across sessions and applying methods based oil Variance Normalization and Maximum Likelihood adaptation to improve across-sessions performance. An average word accuracy of 97.3% for within-session testing using seven EMG channels was achieved. Across-sessions testing without any adaptation yielded an average of 76.2%. By applying the normalization and adaptation methods described herein, recognition rates were brought back up to 87%. Gains from normalization were even higher when a smaller number of channels are used. Comparative experiments indicate that applying more than two electrodes may be desirable, while using more than 5 electrodes generally does not lead to significant performance improvements.

Also, differences between the muscle movement corresponding to non-audible speech and the muscle movement corresponding to audible speech are described herein. While embodiments of the recognizer perform slightly better on audible speech than on nonaudible data, it is possible to merge training data and improve the robustness of the resulting recognizer. In various embodiments, speaker independence is not crucial because EMG-based speech recognition targets applications based on personal devices. For example, various embodiments may be used in a "silent" mobile phone. In such an embodiment, an EMG speech recognizer is trained on a set of sentences typically used for answering a phone call during a meeting, for instance "I'm in a meeting", "Is it urgent?" and "I'll call back later". Such a "silent" mobile phone application enables the user to conduct confidential phone calls without disturbing others nearby.

Figure 4:
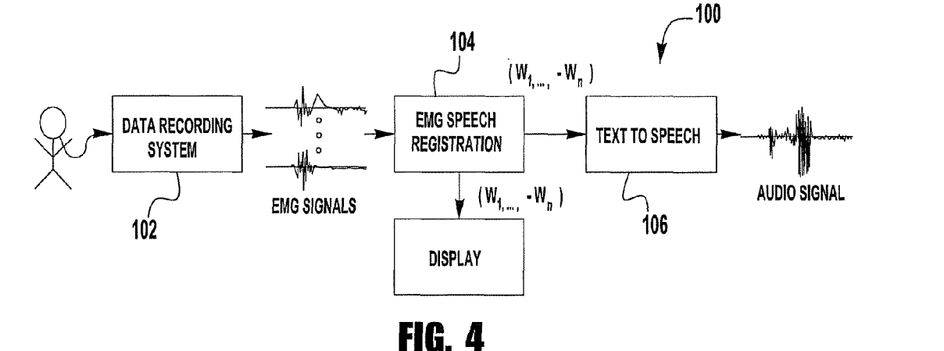
FIG. 4 illustrates an embodiment of a system that may be used for silent speech.

FIG. 4 illustrates an embodiment of a system 100 that may be used for silent speech. The embodiment can be used to conduct phone calls in situations that require silence, for example when calls come in during meetings or in the theater. However, it is not only useful to avoid disturbing bystanders but also to protect privacy and allow for confidential phone calls in public spaces. The silent phone is made possible through the myoelectric speech processing systems and methods described herein. The phone consists of a receiver that converts the incoming audible speech to text, which is silently output on the device screen. Alternatively, acoustic signals could be received over headphones. The system 100 includes a recorder which consists of a physiological data recording system 102 to capture the myoelectric signals, and a myoelectric-based speech recognizer 104 to convert the myoelectric signals into a written form of the corresponding speech. The text is then be transmitted to the conversation partner and converted to speech using a speech synthesizer (text-to-speech) component 106. The described extension to large vocabulary myographic-based speech recognition may be used for the silent phone invention since it allows for the processing of in general unrestricted domains in conversational speaking style.

Figure 5:
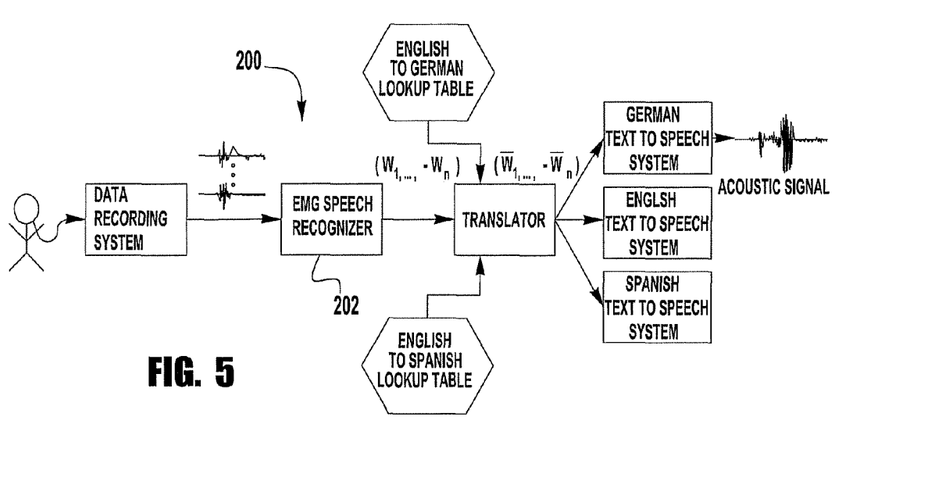
FIG. 5 illustrates an embodiment of a silent translation system.

FIG. 5 illustrates an embodiment of a silent translation system 200. Communication across language barriers is difficult and as described above approached recently by speech translation technology. However, so far one of the major problems with speech translation is that the user of the device faces two speech streams, namely the originally spoken speech from his/her communication partner and the translated audible output of the translation device. As a result both speech sources interfere with each other and make it hard for the listener to understand. One solution is to delay the translated output until the sender has finished speaking. This not only results in significant delays, thus impacting the efficiency but it also makes a conversation very unnatural. The embodiment illustrated in FIG. 5 uses myographic-based speech translation to translate non-audible speech into a chosen language. Myographic signals resulting from silently mouthed speech in a certain language (e.g. English) are captured and recognized by a myographic-based speech recognizer 202. The resulting hypothesis is then translated into another language and transformed into an acoustic signal by an appropriate speech synthesizer. The user of such a translation system would be perceived as speaking in a foreign tongue since his or her silently mouthed English speech would be directly translated and be audible in Chinese, for example.

While the foregoing has been set forth in considerable detail, it is to be understood that the drawings and detailed embodiments are presented for elucidation and not limitation. Design variations may be made but are within the principles of the invention. Those skilled in the art will realize that such changes or modifications of the invention or combinations of elements, variations, equivalents, or improvements therein are still within the scope of the invention as defined in the appended claims. Also, the examples and experimental results illustrated herein are exemplary and are not intended to limit the scope of the embodiments of the invention.

What is claimed is:

1. A method for myoelectric-based processing of speech, the method comprising:
   capturing a myoelectric signal from a user using at least one electrode, wherein the electrode converts an ionic current generated by muscle contraction into an electric current;
   amplifying the electric current;
   filtering the amplified electric current;
   converting the filtered electric current into a digital signal;
   transmitting the myoelectric signal to a digital device;
   transforming the digital signal into a written representation using an automatic speech recognition method; and
   generating an audible output from the written representation using a speech synthesis method.

2. The method of claim 1, further comprising:
   translating the audible output into another language using an automatic translation method to produce a translated representation; and
   generating an audible output from the translated representation.

3. The method of claim 1, further comprising capturing the myoelectric signal from muscle activity in an area of a human upper body including the human face, head, neck, throat, or chest.

4. The method of claim 1, wherein transmitting the myoelectric signal includes transmitting the myoelectric signal by one of a wired connection and a wireless connection.

5. The method of claim 1, further comprising automatically interpreting the myoelectric signal into a plurality of acoustic atoms.

6. The method of claim 5, wherein automatically interpreting the myoelectic signal into a plurality of acoustic atoms includes automatically segmenting into one of an articulatory feature, a phones, a syllable, a word, a phrase and a sentence.

7. The method of claim 1, wherein the speech is made in at least one of normally articulated speech, a whispered speaking mode, murmured speech, speech that is barely or not audible to a bystander, and silently mouthed speech.

8. The method of claim 1, further comprising recognizing the speech without prior knowledge of speaking mode.

9. The method of claim 1, further comprising recognizing spoken utterances independent from a particular speaker.

10. The method of claim 1 additionally comprises the recognition of large vocabulary tasks.

11. The method of claim 1, further comprising recognizing spoken utterances independent from a domain.

12. The method of claim 1, further comprising recognizing spoken utterances independent from a particular language.

13. An apparatus, comprising:
   a recording system adapted to capture, amplify, filter, convert, transmit, and transform a silent speech signal from a first party;
   a myoelectric-based recognizer adapted to convert the signal into a written form of corresponding speech through an automatic speech recognition method;

a device for transmitting the written form to a second party;
a first output device for displaying the written form to the first party;
a second output device for displaying the written form to the second party and for transforming the written form into audible speech;
wherein the apparatus is adapted to recognize and generate large vocabulary tasks in any domain, any language, and any speaking style.

14. The apparatus of claim 13, further comprising at least one electrode.

15. The apparatus of claim 14, wherein the electrode is one of a dry electrode and a wet electrode that is one of loosely settled, glued, fixed, melted, implanted, and attached to the first party.

16. The apparatus of claim 13, further comprising a translation apparatus.

17. An apparatus, comprising:
means for capturing a myoelectric signal from a user using at least one electrode, wherein the electrode converts an ionic current generated by muscle contraction into an electric current;
means for amplifying the electric current;
means for filtering the amplified electric current;
means for converting the filtered electric current into a digital signal;
means for transmitting the myoelectric signal to a digital device;
means for transforming the digital signal into a written representation using an automatic speech recognition method; and
means for generating an audible output from the written representation using a speech synthesis method.

* * * * *